United States Patent
Schulz

[11] 3,912,464
[45] Oct. 14, 1975

[54] METHOD OF AND DEVICE FOR SEPARATING SOLID COMPONENTS FROM A HOT COMBUSTIBLE GAS GENERATED IN A REACTOR

[75] Inventor: Harry Schulz, Wermelskirchen-Tente, Germany

[73] Assignee: Maschinenfabrik Augsburg-Nurnberg A.G., Nurnberg, Germany

[22] Filed: Aug. 6, 1974

[21] Appl. No.: 495,250

Related U.S. Application Data

[63] Continuation of Ser. No. 234,621, March 14, 1972, abandoned.

[30] Foreign Application Priority Data
Mar. 20, 1971 Germany.......................... 2113599

[52] U.S. Cl. .......................... 48/95; 48/61; 48/105; 48/107; 48/128; 48/212; 48/215; 55/97; 55/290; 55/400; 55/459; 252/373
[51] Int. Cl.². B01D 46/00; B01J 7/00; C01B 2/14; C10K 1/02
[58] Field of Search ....... 48/212, 215, 95, 107, 105, 48/128, 196 R, 61, 62, 89, 99; 252/373; 55/97, 290, 400, 523, 459

[56] References Cited
UNITED STATES PATENTS

| | | |
|---|---|---|
| 2,285,804 | 6/1942 | Campbell et al. ............. 23/288 E X |
| 2,835,562 | 5/1958 | Boyer et al. ........................ 55/97 X |
| 2,914,418 | 11/1959 | Eastman ............................ 48/215 X |
| 3,069,251 | 12/1962 | Eastman et al. ...................... 48/215 |
| 3,232,727 | 2/1966 | Guptill, Jr. et al. ................... 48/215 |
| 3,486,327 | 12/1969 | Poincet et al. .................. 48/212 UX |
| 3,582,296 | 6/1971 | Umano et al. ........................ 48/215 |
| 3,615,248 | 10/1971 | Holler, Jr. ........................... 55/523 X |

FOREIGN PATENTS OR APPLICATIONS
1,195,554     6/1965   Germany

*Primary Examiner*—Joseph Scovronek
*Attorney, Agent, or Firm*—Walter Becker

[57] ABSTRACT

A combustible gas is generated under pressure in a reactor by supplying fuel oil, steam and air to the reactor. The hot combustible gas withdrawn from the reactor is subjected to first and second cleaning, or purifying, steps in which solid particles are removed from the gas with at least some of these particles being returned to the reactor for reaction of the carbon content thereof in the reactor.

The hot gases leave the reactor at about 1000° Centigrade and leave the second purifying step at a somewhat lower temperature. The invention provides a fuel gas substantially free of solid particles and among which would be corrosive substances.

7 Claims, 1 Drawing Figure

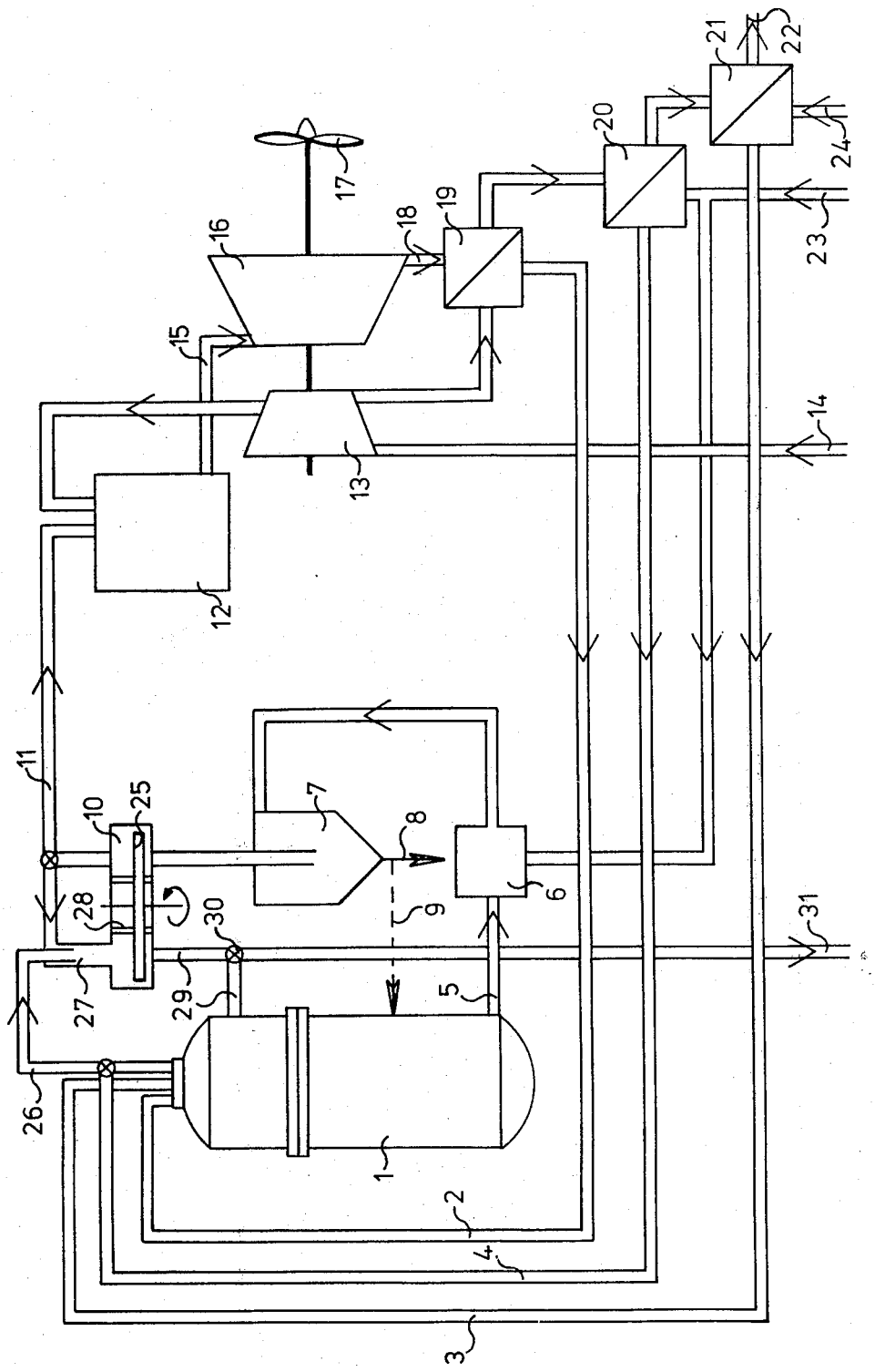

METHOD OF AND DEVICE FOR SEPARATING SOLID COMPONENTS FROM A HOT COMBUSTIBLE GAS GENERATED IN A REACTOR

This is a continuation of application Ser. No. 234,621, filed Mar. 14, 1972 (now abandoned). The present invention relates to a method of and device for separating undesired and/or reusable solid components from a hot combustible gas generated by partial combustion of liquid or solid fuels in a reactor, said combustible gas being under an increased pressure. More specifically, the present invention relates to a method of separating vanadium, alkali components and carbon containing ashes from a hot combustible gas which has been generated by partial combustion of heavy oil, residual oil, or Bunker-C-oil.

It is known that with thermal prime movers as, for instance, gas turbines, it is possible considerably to improve the degree of efficiency of such prime movers by increasing the inlet temperature of the working medium. A heating of the working gas up to, for instance, 1100°C and above is possible only with ash-free fuel distillates or earth gas without the occurrence of corrosion damage in the combustion chamber and in the turbine, especially in the blading. In view of the high prices of such fuels, however, the thermodynamic advantage of the high degree of efficiency is again lost, so that high temperature gas turbines, for economical reasons were with the exception of the aeronautical field used only to a limited extent in continuous operations.

During the combustion of price favorable ash-containing oils such as heavy oil, residual oil and Bunker-C-oil, the gas entrance temperature in turbines must not exceed 650°C because the ashes containing vanadium pentoxide begin to melt at this temperature. Liquid ashes deposit in the first stages of the gas turbines and in cooperation with sodium and sulfur are primarily the culprits for causing the feared corrosion phenomena.

While it has been ascertained that by adding $SiO_2$, $Al_2O_3$ or $MgO$, it is possible slightly to increase the permissible maximum temperatures because in this way the ash components melting at low temperature are converted to components melting at high temperatures, this method does not represent a genuine solution of the high temperature corrosion problem.

The impurities contained in price favorable ash-containing oils can be only partially removed from the liquid fuel. In particular, no method has been known heretofore for economically removing vanadium for mineral oils.

The necessary requirement for realizing the inventive idea consists in the as far as possible solid condition of aggregation of the undesired components. This requirement can be met by a gasification system or installation known per se, inasmuch as the gasification is carried out with a lack of oxygen. In such an instance, from the vanadium components in the fuel charge, only low oxidation stages of the vanadium form with melting temperature above 1200° C. With this gasification or partial combustion of liquid or solid fuels, it is possible from the fuel with air or another oxygen carrier as gasifying means and, if desired, while adding water or steam, to produce combustible gases. Such gasifying methods are generally known from German Pat. No. 1,231,222, the German Auslegeschrift No. 1,055,742, and the German Offenlegungsschriften Nos. 1,926,919, 1,545,439, and 1,940,078. The generated gas likewise contains a number of solid materials among which there is a considerable proportion of combustible components.

Gas purifying methods in cooperation with combustion chambers have also become known. Thus, for instance, the German Patent No. 1,195,554 describes a filter change device which may be operated by heavy oil. In this instance, the filter is a circular filter which is rotatable about an axis arranged parallel to the combustion chamber axis and located outside the combustion chamber. During the rotation of the filter, the filter part saturated with impurities leaves the pipe and can be regenerated in a filter change chamber located outside the pipe. The drawback of such a device consists in the considerable structural expenses for the filter exchange and the necessity of the filter exchange at high temperatures. In addition thereto, with this method there is already present an oxidizing atmosphere during the filtering so that the melting point of the ashes lies at approximately 650° C.

Finally, the German Patent No. 1,259,001 discloses a gasifying method for preventing corrosion damage by vanadium and alkali components contained in heating oils, according to which method the ash components bringing about the corrosion damage are removed within the reactor by conveying the gases along a curved path so that ash particles are by centrifugal forces centrifuged toward the side. Electromicroscopic photos of the soot and ash particles generated when gasifying oil by partial combustion have proved that the granular size of the impurifications is to a considerable extent below 1 $\mu$m so that a separation by centrifugal forces within the reactor is hardly possible.

Furthermore, more than 95% of the solid particles which are still usable would have to be removed if the fuel gas is to be employed for high temperature gas turbines. This is not possible with the method set forth above.

It is, therefore, an object of the present invention to provide a method of the general type set forth above which will overcome the drawbacks outlined above and will make it possible to widen the fuel basis for high temperature processes, especially for gas turbines with inlet temperatures exceeding 650° C. so that low priced ash-containing fuels can be employed while the beneficial degree of efficiency of these thermal engines can actually be taken advantage of in an economical manner.

These and other objects of the invention will appear more clearly from the following specification, in connection with the accompanying drawing, diagrammatically illustrating a plant for practicing the method according to the invention. The economical exploitation of low priced ash-containing fuels depends primarily on removing the components causing the corrosion phenomena, without re-cooling and subsequent re-heating of the fuel gas, and furthermore depends on having the fuel gas ash free, and furthermore depends on that the combustible components or ingredients contained in the ashes will not be lost but can be exploited to a maximum extent.

The problem underlying the present invention has been solved according to the present invention by generating the combustible gas in a manner known per se in a reactor in an atmosphere so controlled as to oxygen that the components to be separated out will at temperatures of 1000 to 1250 C. not yet be transformed into a gasified or liquid condition and that from these hot fuel gases without intermediate cooling, or with only slightly intermediate cooling, in an adjacent hot gas purifying system the solid components are separated out and are continuously or intermittently returned to the reactor for a further transformation of the combustible portion thereof. Combustion gas that exits from the hot gas purifying system has a temperature in a range between 600°C and 950°C, preferably 950°C.

While on one hand the heating gas to be purified is passed through the purifying system, it will be appreciated that on the other hand at the same time the separated solid components are in countercurrent flow blown out of the purifying system by water steam or by a water steam — gas mixture by means of an agitator and are conveyed to the reactor. In this way a continuous operation will be possible while the required water steam is withdrawn from the water steam which is present anyhow for generating gas in the reactor, and the employed gas is already purified gas leaving the purifying system. The return of all of the components separated in the purifying system to the reactor is possible without difficulty because it consists mainly of carbon with the percentage by weight of the ashes less than 1% of all of the solid substances. The return of the separated components is also necessary because the carbon is directly bound to the ashes. In view of the return of the separated substances into the reactor, the carbon can be reacted and thereby an increase in the total degree of efficiency can be realized.

While with the described operation the inner reactor circuit collects more and more pure ashes, this can be compensated in a simple manner by withdrawing the separated components automatically or manually at certain intervals briefly from the reactor circuit as soon as a limiting load of the hot gas purifying system has been reached. In this way a fast cleaning or scavenging action can be realized. The device for carrying out the method according to the present invention primarily comprises a rotation filter with one or more stages, in which the filter segment saturated with impurities is continuously or intermittently turned out of the raw gas flow and is continuously or intermittently blown free in opposite direction in a section which is located opposite the axis of rotation of the filter. As filter material there may be employed a high temperature resistant porous sinter metal and/or a ceramic material. It may be expressly mentioned that instead of the rotation filter also other filter types as, for instance, filters with two or more chambers and periodic purification of one filter chamber at a time may be employed.

It appears expedient to have the rotation filter preceded by a likewise known pre-separator. By means of this pre-separator, the coarse solids are separated and returned to the atmosphere or likewise conveyed into the reactor. In this way the time period within which the filter reaches the limit of its filtering capacity is delayed.

It is furthermore suggested between the reactor and the purifying system to provide the heat exchanger in order to cool the gas discharged from the reactor to a uniform temperature favorable for the purifying operation. By means of this slight intermediate cooling, an agglomeration of minute solid particles can be effected which will aid the subsequent separating output.

As will be evident from the above, the objects outlined in the introductory portion of the specification have been realized. In addition thereto, there is obtained the advantage that not only the combustible gas conveyed to the high temperature installation is free from corrosion-fostering components, but that in view of the reducing atmosphere no longer will damage the reactor and the purifying system inasmuch as the oxidation of the vanadium to pentoxide will not occur and only ashes with a high melting temperature will be formed.

Referring now to the drawing in detail, and since the invention is preferably suitable for high temperature gas turbine plants, the drawing shows such complete plant in a diagrammatic illustration. Through feeding lines 2, 3 and 4, air, oil, and if desired, water steam is introduced into reactor 1 and is therein gasified in a controlled atmosphere. The combustible gas which leaves the reactor 1 through conduit 5 and has a temperature of approximately 1250° C. is, in conformity with the specific example shown cooled by means of an injection cooler 6 to a temperature of approximately 1000° C., which is admissible for the purification. As a result thereof, an agglomeration of minute solid particles is effected which will later aid in the separating action. In a pre-separator 7, the combustible gas is separated from coarse solids which latter selectively either follow the arrow 8 into the atmosphere, or follow the dash line 9 back to the reactor 1. From the pre-separator 7, the combustible gas is passed through a rotation filter 10 where all solid components are separated from the gas. Finally, the combustible gas passes through a conduit 11 into a combustion chamber 12 where the combustible gas is burned after it has been supplied with air from a compressor 13. The compressor draws fresh air through a conduit 14. At approximately 1100° C., the gases pass through conduit 15 into the high temperature gas turbine 16 which, in addition to driving the machine 17, also drives the compressor 13.

The expanded gas which has been cooled down to 400° C. leaves the turbine 16 at 18 and feeds an air pre-heater 19, a steam generator 20, and an oil pre-heater 21 until the gas flows as waste gas into the atmosphere at 22. In the air pre-heater 19, air delivered by the compressor 13 is heated up to approximately 360° prior to the air passing into the reactor. The steam generator 20 converts the water entering at 23 into steam which latter is, at an approximate temperature of 250° C. passed to the reactor 1. The oil pre-heater 21 conveys to the oil which enters at 24 and is passed to the reactor 1 through conduit 3, a temperature of approximately 200° C.

The rotation filter 10 primarily consists of one or more rotatably journaled filter discs 25. That part of the filter disc 25 which is saturated with separated ingredients is in a continuous manner turned out of the gas flow and on the other side of the axis of rotation is, in opposite flow direction, again blown free of particles collected from the gas. For blowing out the filter disc 5, water steam is withdrawn from conduit 4 through a conduit 26, and combustible gas is branched off from conduit 11 and by means of an ejector 27 is brought into the reactor 1. Air is not suitable for cleaning or blowing out the filter disc 25, because the seal 28 between the two filter sides will not assure that a combustion will be prevented. The thus formed mixture of water steam, gas, and separated components passes through conduit 29 into the reactor 1 where the obtained carbon is converted. As soon as the gradual enrichment of the ashes in the inner circuit 1, 5, 6, 7, 10, 25 and 29 has reached the limit of loadability for the filters 10, 25, the supply of separated components to the reactor 1 is, for a brief time, cut off by means of a valve provided in conduit 29 or a flap 30, whereas a discharge opening 31 is freed. In this way, a quick withdrawal of the ashes is effected. The control of the valve or flap 30 may be effected automatically, for instance, in conformity with the pressure drop in the filter.

It may also be mentioned that by means of the above described method of gas purification, it is possible easily to adapt the gas purification to the mass throughflow under partial load by changing the rotation speed of the filter disc 25.

For the sake of completeness, it may also be mentioned that the right-hand portion of the drawing diagrammatically indicates a high temperature gas installation which, however, does not form a part of the invention, but merely serves for a better understanding of the invention. It is a matter of course that the present invention is also applicable to other installations or plants.

It is furthermore to be understood that the present invention is, by no means, limited to the particular showing in the drawing, but also comprises any modifications within the scope of the appended claims.

What is claimed is:

1. A method of separating solid components from a hot combustible gas which is under pressure and which is generated by partial combustion in a reactor of fuel which is an oil containing a fraction which forms ash upon oxidation of the oil, comprising the steps of generating the combustible gas in the reactor in a reaction region by partial oxidation of the fuel in an atmosphere of steam and oxygen at temperatures from 1000° to 1250°C, so that the components to be separated remain in solid condition, conveying hot combustion gas away from the reaction region, separating solid components from the hot gases in a separation region, cleaning the gas from said separation region by passing it through a rotation filter in an adjacent hot gas purifying system, and conveying the separated out solid components back again to the reaction region of the reactor for partial conversion to combustible gas in a further transformation of the combustible components.

2. A method according to claim 1, in which during gas generation in the reactor, steam is used for returning the separated solid components.

3. A method according to claim 1, in which returning of separated components to the reactor includes utilizing some of the cleaned combustible gas.

4. A method according to claim 1, in which gas leaving the separation region is at a temperature within a range of from about 600° to about 950°C upon entry thereof into the hot gas purifying system.

5. An apparatus for generating and purifying combustion gas comprising in combination: a reactor, means for supplying preheated oil and preheated air and preheated steam to said reactor for partial combustion therein to generate a hot combustible gas, a hot gas purifying system arranged directly after the reactor including first purifying means receiving said gas from said reactor and removing particles above a first predetermined size therefrom, a second purifying means receiving said gas from said first purifying means and removing particles above a second predetermined size smaller than said first predetermined size therefrom, said second purifying means comprising a housing, a filter disc rotatable in the housing, means for causing said hot gas to flow through a circumferential portion of said disc in one axial direction, and means for causing cleaned gas from said purifying system and steam to flow through another circumferential portion of said disc in the opposite axial direction, said filter disc having solid components collecting thereon conveyed back into said reactor and comprising a porous member formed of material selected from the class of sintered metal and ceramics, and said housing comprising divider means isolating the flow of said hot gas from the flow of said cleaned gas.

6. An apparatus according to claim 5 which includes a heat exchanger interposed between said reactor and said first purifying means.

7. An apparatus according to claim 6, in which said heat exchanger is an injection cooler.

* * * * *